United States Patent [19]

Boschnakow et al.

[11] 3,954,513

[45] May 4, 1976

[54] FLAME CUTTING BY MEANS OF AN OXYGEN BEAM

[75] Inventors: Ivan Boschnakow, Halle; Hans Fröhlich, Dollnitz, both of Germany

[73] Assignee: Zentralinstitut fur Schweisstechnik der Deutschen Demokratischen Republik, Halle, Germany

[22] Filed: July 14, 1975

[21] Appl. No.: 595,798

[30] Foreign Application Priority Data

July 31, 1974 Germany................................ 180206

[52] U.S. Cl............................................... 148/9 R
[51] Int. Cl.²........................................... B23K 7/00
[58] Field of Search............. 148/9; 266/23 R, 23 P, 266/23 T

[56] References Cited
UNITED STATES PATENTS

| 2,184,562 | 12/1939 | Rockefeller et al.................. | 148/9 R |
|---|---|---|---|
| 2,195,384 | 3/1940 | Zobel et al........................... | 148/9 R |
| 3,415,693 | 12/1968 | Gollwitz et al....................... | 148/9 R |
| 3,498,848 | 3/1970 | Kidowaki............................. | 148/9 R |

Primary Examiner—W. Stallard
Attorney, Agent, or Firm—Diller, Brown, Ramik & Wight

[57] ABSTRACT

For the purpose of improving the economics of flame cutting and the qualitative characteristics of flame-cut components, and with the object of developing a method of flame cutting, particularly precision flame cutting, wherein the interaction between the cutting oxygen and the molten metal flow is qualitatively varied in such a way that the speed-inhibiting effect of the contamination boundary layer is considerably reduced and the cutting speed increased whilst maintaining the cutting quality, the invention proposes the adoption of certain defined operating parameters of a cutting torch with a conically expanded cutting nozzle of circular cross-section and ranges of oxygen pressures, appropriate to different thicknesses of the cut.

15 Claims, No Drawings

FLAME CUTTING BY MEANS OF AN OXYGEN BEAM

The invention relates to a method and apparatus for increasing the cutting speed and improving the cutting quality of flame cutting by means of an oxygen beam, particularly of precision flame cutting using conically expanded cutting nozzles of circular cross-section.

For flame cutting it is known to use a great variety of nozzle shapes, particularly cylindrical, conically expanded or Laval-like and other sections of the cutting oxygen channel, the cutting oxygen channel having a channel cross-section which is circular or of any other desired shape. Under the known conditions, conventional flame cutting with cutting torches arranged perpendicular to the material may be carried out, as well as known high-speed cutting processes using an inclined cutting torch or special cutting nozzles, for example multi-beam-, flat- and other known nozzle shapes. The data acquired from such processes indicate that the flame cutting process takes the following form:

The cutting oxygen beam emerging from the cutting nozzle impinges on the material to be separated, burns the latter with the aid of a heating flame and produces a kerf, a molten stream of material moving towards its combustion front in the direction of flow of the oxygen beam. At the surface of this molten stream an iron oxide layer is disposed below which predominantly molten iron is located. The direct contact between the iron and the oxygen is impeded by the oxide surface layer. For combustion of the iron to take place, the oxygen and iron have to be conveyed through this oxide surface layer.

This conveyance is based on diffusion- and turbulence-like mixing processes. There is also formed at the phase interface between the molten iron oxide and the gaseous oxygen beam a gaseous boundary layer, which consists of the gaseous contaminants of the cutting oxygen, e.g. nitrogen, argon and carbon dioxide as well as the gaseous products of combustion of the steel combustion, such as sulphur dioxide, carbon dioxide and carbon monoxide.

For combustion of the iron to take place, the oxygen additionally has to penetrate this gaseous contamination boundary layer, which entails the disadvantage that the cutting speed is thereby limited to a considerable degree.

Further disadvantages connected with known types of cutting nozzle result from the fact that notwithstanding the formation of a gas-dynamically satisfactory cutting oxygen beam in the sub-sonic as well as in the super-sonic range no variation in the quality of the alternating effect between the cutting oxygen beam and the molten material flow can be achieved, and that as a consequence of this cause the cutting speed is too low for high quality cutting.

Furthermore, the known flame cutting methods possess the disadvantage that they involve the use of such cutting nozzles which possess the above-mentioned disadvantages. Although it is known to achieve a certain increase in the cutting speed by applying special measures, in every such case there is the disadvantage that the quality of the cut is reduced and/or the material losses are increased.

In those cases where it was found possible to increase the cutting speed without reducing the quality of the cut or increasing the material losses, by means of special measures, this increase in cutting speed must be regarded as inadequate.

The purpose of the invention resides in improving the economics of flame cutting and the qualitative characteristics of flame-cut components.

The object of the invention is to develop a method of and apparatus for flame cutting, particularly precision flame cutting, wherein the interaction between the cutting oxygen and the molten metal flow is, in suitable manner, qualitatively varied in such a way that the speed-inhibiting effect of the contamination boundary layer is considerably reduced and the cutting speed increased whilst maintaining the cutting quality.

It has now been found that the disadvantages described can, according to the invention, be eliminated by the use of conically enlarged cutting nozzles of circular cross-section by setting the flow of cutting oxygen in the kerf to a value such that it continuously partially destroys the oxide surface layer which is formed in the course of the cutting process and which militates against contact between the cutting oxygen and the iron melt, by setting the operating parameters of the cutting torch to $$d_k = 0.40 \times (s/p) \pm 0.05 \text{ mm}$$

and $$d = (0.021 \times p + 1.54) d_k \pm 0.05 \text{ mm},$$

where $d_k$ = the nozzle bore diameter, $d$ = the diameter of the mouth, $p$ = the pressure of the cutting oxygen and $s$ = the thickness of the cut, and the cutting speed is to be set to a drag of 1 to 8% and the length of the heating flame to at least 5 times the thickness of the cut but to at least 250 mm and the pressure of the cutting oxygen is to be maintained within the range 16 to 60 kp/cm² at a thickness of the cut within the range 3 to 80 mm. In consequence of the modified surface configuration of the molten material flow, caused by the continuous partial destruction of the closed form, the speed-inhibiting effect of the molten material is considerably reduced.

In an oxygen cutting nozzle for carrying out the method, its angle of expansion is 5° to 15°, preferably 8°, a minimum nozzle bore diameter of 0.36 ± 0.03 mm and a mouth diameter of 0.69 ± 0.04 mm being provided for a thickness of the cut of 3 to 20 mm. For a thickness of the cut of 10 to 40 mm a minimum nozzle bore diameter of 0.58 ± 0.04 mm and a mouth diameter of 1.1 ± 0.04 mm are provided, whilst for a thickness of the cut of 20 to 80 mm the minimum nozzle bore diameter is arranged to be 0.75 ± 0.04 mm and the mouth diameter 1.42 ± 0.04 mm. In all these cases a pressure of the cutting oxygen of 16 to 22 kp/cm² is employed.

In a further oxygen cutting nozzle having an angle of expansion of 5° to 15°, preferably 8°, a minimum nozzle diameter of 0.35 ± 0.03 mm and a mouth diameter of 0.92 ± 0.04 mm are used for a thickness of the cut of 5 to 40 mm, whilst a minimum nozzle diameter of 0.46 ± 0.03 mm and a mouth diameter of 1.21 ± 0.04 mm are provided, a pressure of the cutting oxygen of 40 to 60 kp/cm² being required to be maintained.

Basically the advantage of the invention consists in the very good cutting conditions which make an increase in the cutting speed up to 100% possible, without any resulting increase in the consumption of the cutting oxygen or in material loss and without any deterioration of the cutting quality. A further advantage resides in the fact that the thermal distortion of the cut components is also reduced.

The invention will now be explained in greater detail with reference to an example in the form of a table.

From the following table the advantages derived from the use of the cutting nozzle A for carrying out the method by comparison with a conventional cutting nozzle B, as regards cutting speed, will be apparent, the cutting oxygen consumption being the same in both cases. Analogously the wage- and cutting oxygen costs per meter of cut are reduced by increasing the cutting speed by 50%.

| NOMINAL PARAMETER | TYPE OF NOZZLE | |
| --- | --- | --- |
| | A | B |
| Thickness of cut (mm) | 20 | 20 |
| Material in accordance with TGL *7960 | St 38u-2** | St 38u-2** |
| Cutting quality according to TGL*14902 | II to III | II to III |
| Cutting oxygen consumption (m³/h) | 3 | 3 |
| Oxygen purity (%) | 99.5 | 99.5 |
| Pressure of cutting oxygen (kp/cm²) | 50 | 4.5 |
| Fuel gas | acetylene | acetylene |
| Nozzle spacing from the sheet metal (mm) | 5 | 5 |
| Disposition of the torch to the sheet metal | perpendicular | perpendicular |
| Minimum nozzle bore diameter (mm) | 0.35±0.03 | 1.1±0.03 |
| Mouth diameter (mm) | 0.92±0.04 | 1.2±0.04 |
| Nozzle expansion angle (°) | 8° | 7° |
| Kerf width (mm) | 1.4 | 1.5 |
| Cutting speed (mm/min) | 600 | 400 |

*a Standard of the German Democratic Republic
**a general construction steel of quality group 2, unkilled and having a tensile strength of at least 38 kp/cm²

We claim:

1. A method of flame cutting a workpiece by means of an oxygen beam, wherein the flow of cutting oxygen in the kerf of the workpiece is set to a value such that it continuously at least partially destroys the gaseous contamination layer which is formed in the course of the cutting operation and which militates against contact between the cutting oxygen and the melt, and also at least partially destroys the oxide surface layer formed, wherein the operating parameters of a cutting torch having a conically expanded cutting nozzle of circular cross-section are given by the equations $$d_k = 0.40 \times (s/p) \pm 0.05 \text{ mm}$$

and $$d = (0.021 \times p + 1.54) d_k \pm 0.05 \text{ mm},$$

where
$d_k$ is the nozzle bore diameter
$d$ is the diameter of the nozzle mouth
$p$ is the pressure of the cutting oxygen and
$s$ is the thickness of the cut,
and wherein the cutting speed is set for a drag of 1 to 8%, the length of the heating flame is at least five times the thickness of the cut but at least 250 mm, the pressure of the cutting oxygen is between 16 and 60 kp/cm² and the thickness of the cut is between 3 and 80 mm.

2. A method according to claim 1, wherein the apical angle of the conically expanded cutting nozzle is between 5° and 15° and the pressure of the cutting oxygen is between 16 and 22 kp/cm².

3. A method according to claim 2, wherein the said apical angle is 8°.

4. A method according to claim 2, wherein the thickness of the cut is between 3 and 20 mm and the nozzle has a minimum bore diameter of 0.36 ± 0.03 mm and a mouth diameter of 0.69 ± 0.04 mm.

5. A method according to claim 3, wherein the thickness of the cut is between 3 and 20 mm and the nozzle has a minimum bore diameter of 0.36 ± 0.03 mm and a mouth diameter of 0.69 ± 0.04 mm.

6. A method according to claim 2, wherein the thickness of the cut is between 10 and 40 mm and the nozzle has a minimum bore diameter of 0.58 ± 0.04 mm and a mouth diameter of 1.1 ± 0.04 mm.

7. A method according to claim 3, wherein the thickness of the cut is between 10 and 40 mm and the nozzle has a minimum bore diameter of 0.58 ± 0.04 mm and a mouth diameter of 1.1 ± 0.04 mm.

8. A method according to claim 2, wherein the thickness of the cut is between 20 and 80 mm and the nozzle has a minimum bore diameter of 0.75 ± 0.04 mm and a mouth diameter of 1.42 ± 0.04 mm.

9. A method according to claim 3, wherein the thickness of the cut is between 20 and 80 mm and the nozzle has a minimum bore diameter of 0.75 ± 0.04 mm and a mouth diameter of 1.42 ± 0.04 mm.

10. A method according to claim 1, wherein the apical angle of the conically expanded cutting nozzle is between 5° and 15° and the pressure of the cutting oxygen is between 40 and 60 kp/cm².

11. A method according to claim 10, wherein the said apical angle is 8°.

12. A method according to claim 10, wherein the thickness of the cut is between 5 and 40 mm and the nozzle has a minimum bore diameter of 0.35 ± 0.03 mm and a mouth diameter of 0.92 ± 0.04 mm.

13. A method according to claim 11, wherein the thickness of the cut is between 5 and 40 mm and the nozzle has a minimum bore diameter of 0.35 ± 0.03 mm and a mouth diameter of 0.92 ± 0.04 mm.

14. A method according to claim 10, wherein the thickness of the cut is between 20 and 80 mm and the nozzle has a minimum bore diameter of 0.46 ± 0.03 mm and a mouth diameter of 1.21 ± 0.04 mm.

15. A method according to claim 11, wherein the thickness of the cut is between 20 and 80 mm and the nozzle has a minimum bore diameter of 0.46 ± 0.03 mm and a mouth diameter of 1.21 ± 0.04 mm.

* * * * *